United States Patent
Dionne

(10) Patent No.: US 11,719,248 B2
(45) Date of Patent: Aug. 8, 2023

(54) AIRCRAFT PROPULSION SYSTEM WITH PROPELLER AND COOLING FAN

(71) Applicant: PRATT & WHITNEY CANADA CORP., Longueuil (CA)

(72) Inventor: Luc Dionne, Candiac (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/070,154

(22) Filed: Oct. 14, 2020

(65) Prior Publication Data

US 2022/0112846 A1    Apr. 14, 2022

(51) Int. Cl.
| | |
|---|---|
| *F04D 25/08* | (2006.01) |
| *B64D 33/08* | (2006.01) |
| *F01P 5/06* | (2006.01) |
| *F04D 29/58* | (2006.01) |
| *F02B 53/02* | (2006.01) |
| *F02B 61/04* | (2006.01) |

(52) U.S. Cl.
CPC ........... *F04D 25/082* (2013.01); *B64D 33/08* (2013.01); *F01P 5/06* (2013.01); *F04D 29/5826* (2013.01); *F02B 53/02* (2013.01); *F02B 61/04* (2013.01); *F05D 2220/323* (2013.01); *F05D 2260/213* (2013.01)

(58) Field of Classification Search
CPC ...... F04D 25/082; F04D 29/5826; F01P 5/06; B64D 33/08; F02B 61/04; F02B 53/02; F05D 2260/213; F05D 2220/323
USPC ...................................................... 123/41.66
See application file for complete search history.

(56) References Cited

U.S. PATENT DOCUMENTS

| | | | |
|---|---|---|---|
| 1,386,493 A | 8/1921 | Raymond | |
| 2,401,584 A * | 6/1946 | Rhines | F02M 1/00 |
| | | | 123/41.64 |
| 2,456,151 A | 12/1948 | Sawyer | |
| 2,586,054 A | 2/1952 | Jonas | |
| 4,817,382 A * | 4/1989 | Rudolph | F02C 3/10 |
| | | | 416/129 |
| 4,892,269 A | 1/1990 | Greco et al. | |
| 7,891,163 B2 | 2/2011 | Richards | |
| 9,637,232 B2 | 5/2017 | Horn | |
| 10,557,407 B2 | 2/2020 | Dussault et al. | |

(Continued)

FOREIGN PATENT DOCUMENTS

| | | |
|---|---|---|
| GB | 2179702 A | 3/1987 |
| WO | 8910300 | 11/1989 |

OTHER PUBLICATIONS

Wikipedia, Internal combustion engine, https://en.wikipedia.org/wiki/Internal_combustion_engine, accessed, Oct. 10, 2020.

(Continued)

*Primary Examiner* — Yi-Kai Wang
(74) *Attorney, Agent, or Firm* — Norton Rose Fulbright Canada LLP

(57) ABSTRACT

An aircraft propulsion system comprises an engine, a propeller drive shaft drivingly engaged with the engine, a propeller for propelling an aircraft and a fan driving cooling air along a flow path in thermal communication with the engine. The engine may be an internal combustion engine or other engine type having heat rejection requirements and the fan may facilitate cooling of the engine. The propulsion system may have a pusher configuration.

14 Claims, 8 Drawing Sheets

FORWARD ◄────► AFT

(56) References Cited

U.S. PATENT DOCUMENTS

| | | |
|---|---|---|
| 2009/0202357 A1 | 8/2009 | Stern |
| 2012/0325345 A1* | 12/2012 | Horn .................... B64C 39/024 |
| | | 137/561 A |
| 2015/0275756 A1 | 10/2015 | Bolduc et al. |
| 2017/0037756 A1* | 2/2017 | Julien .................... F02K 1/386 |
| 2019/0323427 A1* | 10/2019 | Mackin ................. B64D 27/24 |
| 2022/0017214 A1* | 1/2022 | Orbon .................... B64C 27/46 |

OTHER PUBLICATIONS

Wikipedia, Pusher configuration, https://en.wikipedia.org/wiki/Pusher_configuration, accessed on Oct. 10, 2020.

European Patent Office, Communication re. extended European search report for European patent application No. 21202766.8, dated Feb. 15, 2022.

\* cited by examiner

AIRCRAFT PROPULSION SYSTEM WITH PROPELLER AND COOLING FAN

TECHNICAL FIELD

The disclosure relates generally to aircraft engines, and more particularly to cooling aircraft engines during operation.

BACKGROUND

An aircraft engine used in a pusher configuration can be more difficult to cool than an aircraft engine used in a tractor configuration. In a tractor configuration, downwash from the propeller can be used to create an airflow for cooling the engine of an aircraft propulsion system. However, this effect is not present in a pusher configuration. To counter this, additional cooling equipment may be installed but this additional equipment can add weight and bulk to the aircraft propulsion system. Improvement is desirable.

SUMMARY

In one aspect, the disclosure describes an aircraft propulsion system comprising: an internal combustion engine using intermittent combustion during operation; a propeller drive shaft drivingly engaged with the internal combustion engine; a propeller for propelling an aircraft, the propeller being drivingly engaged with the propeller drive shaft; and a fan operatively disposed to drive cooling air along a flow path in thermal communication with the internal combustion engine, the fan being drivingly engaged with the propeller drive shaft.

In another aspect, the disclosure describes an aircraft propulsion system having a pusher configuration. The aircraft propulsion system comprises: an engine; a propeller drive shaft drivingly engaged with the engine; a propeller for propelling an aircraft, the propeller having propeller blades and being drivingly engaged with the propeller drive shaft and being disposed aft of the engine; a fan operatively disposed to drive cooling air along a flow path in thermal communication with the engine, the fan having fan blades and being drivingly engaged with the propeller drive shaft; and a heat exchanger configured to facilitate heat transfer between the cooling air driven by the fan and a fluid carrying heat from the engine.

In a further aspect, the disclosure describes a method of cooling an internal combustion aircraft engine driving a propeller in a pusher configuration. The method comprises: operating the internal combustion engine using intermittent combustion to drive the propeller via a propeller drive shaft; driving a fan via the propeller drive shaft, the fan driving cooling air along a flow path in thermal communication with the internal combustion engine; and facilitating heat transfer between the cooling air and the internal combustion engine.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure describes aircraft propulsion systems and associated methods for cooling engines of such aircraft propulsion systems. In various embodiments, the systems and methods described herein make use of a fan in driving engagement with a propeller drive shaft driven by the engine to drive cooling air along a flow path in thermal communication (e.g., via convective heat transfer) with the engine. In some embodiments, the systems and methods described herein may provide relatively simple, compact and lightweight cooling arrangements for aircraft propulsion systems having pusher configurations. However, aspects of the systems and methods described herein may also be applicable to aircraft propulsion systems having tractor configurations.

In some embodiments, the systems and methods described herein may also facilitate cooling of an aircraft engine when an aircraft to which the engine is mounted is stationary or taxiing at low speed on the ground when the ambient air around the engine is relatively slow-moving and alone does not provide significant cooling of the engine. The systems and methods described herein may also facilitate cooling of an aircraft engine when the aircraft is in a take-off phase and/or an initial climb phase where the engine is operating at or near maximum power output and the requirement for heat rejection is relatively high.

The described systems and methods may be used for cooling various types of aircraft engines including internal combustion engines or other types of engines having relatively high heat rejection requirements. The described systems and methods may be used on various types of manned or unmanned aircraft (e.g., drones) such as corporate, private, fixed-wing, commercial and passenger aircraft. In some embodiments, the systems and methods described herein may also promote beneficial air flow conditions on a spinner fitted over a hub of a propeller in a pusher configuration.

Hereinafter, the term "connected" or "coupled to" may include both direct connection or coupling (in which two elements contact each other) and indirect connection or coupling (in which at least one additional element is located between the two elements). The term "substantially" as used herein may be applied to modify any quantitative representation which could permissibly vary without resulting in a change in the basic function to which it is related.

Aspects of various embodiments are described below through reference to the drawings.

Figure 1:
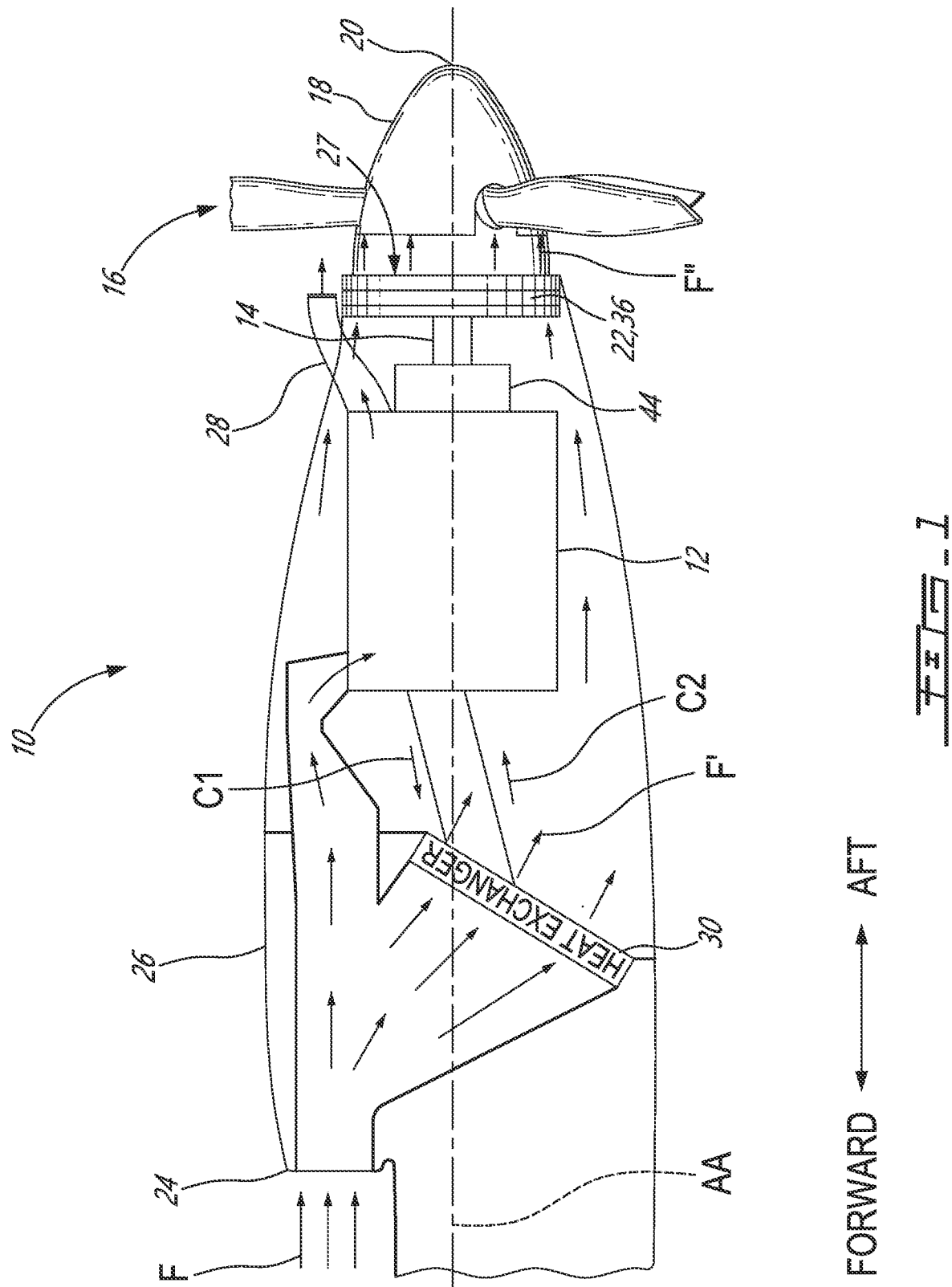
FIG. 1 shows a schematic side elevation view of an aircraft propulsion system having a pusher configuration and a cooling fan as described herein.

FIG. 1 shows a schematic axial cross-section view of aircraft propulsion system 10 (referred hereinafter as "system 10") having a pusher configuration. System 10 may include engine 12 having propeller drive shaft 14 to which propeller 16 may be drivingly engaged. Forward and aft directions are indicated in FIG. 1 relative to an installation of system 10 on an aircraft in a pusher configuration. Propeller 16 may be disposed aft of engine 12. System 10 may be incorporated into a variety of aircraft and in a variety of locations on such aircraft. For example, system 10 may be mounted to a fuselage or to a wing of a fixed-wing aircraft.

Engine 12 may include any suitable type of aircraft engine having a heat rejection requirement. In some embodiments, engine 12 may include a gas turbine engine in a turboprop installation. In some embodiments, engine 12 may include an internal combustion engine using intermittent combustion during operation and having a relatively high heat rejection requirement. Such internal combustion engine may be a piston engine or a (e.g., Wankel) rotary engine for example. In some embodiments, engine 12 may be a compound cycle engine as described in U.S. Pat. No. 10,107,195 (Title: COMPOUND CYCLE ENGINE), the entire contents of which are incorporated by reference herein. Engine 12 may be located within a cavity of housing 26, where housing 26 may be a nacelle or an aft fuselage portion of an aircraft for example.

Engine 12 may drive propeller drive shaft 14 using continuous or intermittent combustion of a mixture of fuel and air depending on the type of engine used. In example embodiments, air is received within housing 26 via inlet 24 and directed to engine 12. The exhaust gas generated as a result of combustion within engine 12 may exit system 10 via exhaust gas outlet 28, or otherwise. Exhaust gas outlet 28 may include one or more exhaust stubs extending through housing 26.

Engine 12 may include or be connected to one or more heat exchangers 30 (e.g., radiators) (referred hereinafter in the singular) for rejecting heat generated by engine 12. Heat exchanger 30 may facilitate heat transfer between two of more fluids. For example, heat exchanger 30 may be in fluid communication with one or more fluids (e.g., coolant and/or lubricating oil) circulating through engine 12 and carrying heat out of engine 12. A flow of fluid carrying heat from engine 12 to heat exchanger 30 is represented by arrow C1 in FIG. 1. A flow of the same fluid returning to engine 12 after having released heat via heat exchanger 30 is represented by arrow C2 in FIG. 1. Heat exchanger 30 may be disposed inside housing 26. Heat exchanger 30 may be a cross-flow heat exchanger. Heat exchanger 30 may be a liquid-to-air convective style heat exchanger where heat is transferred from the heat-carrying fluid to a flow of cooling air.

System 10 may include propeller 16 in driving engagement with propeller drive shaft 14. In example embodiments, propeller 16 is mechanically secured to propeller drive shaft 14 to rotate at the same speed as propeller drive shaft 14. In other words, propeller 16 may driven by and be mounted for common rotation with propeller drive shaft 14. Propeller 16 may be in a coaxial alignment with propeller drive shaft 14. Axis AA may be a rotation axis for both propeller 16 and propeller drive shaft 14. Gearbox 44 may be operatively disposed between engine 12 and propeller drive shaft 14. Gearbox 44 may be of a speed-reducing type so that a rotational speed of propeller drive shaft 14 may be lower than an output rotational speed of engine 12. Propeller 16 may include a plurality of propeller blades for generating thrust. The orientation (i.e., pitch) of the propeller blades may be controllably variable.

Spinner 18 may be mounted for common rotation with propeller 16, and may include passages for allowing the passage of respective propeller blades of propeller 16 through spinner 18. Spinner 18 may include aft distal end 20. Spinner 18 may be a streamlined fairing fitted over a hub of propeller 16.

Fan 22 may be operatively disposed to drive cooling air along a flow path in thermal communication with engine 12. Fan 22 may be part of a propeller assembly of system 10. The flow path of cooling air may extend inside of housing 26 from inlet 24 to cooling air outlet 27. Fan 22 may also be in driving engagement with propeller drive shaft 14. System 10 is shown as a pusher propulsion system, where fan 22, propeller 16, and spinner 18 are disposed aft (i.e., downstream) of engine 12. Fan 22 may drive cooling air from outside of housing 26 through inlet 24 into the interior cavity of housing 26, and may further drive the cooling air out of the interior cavity of housing 26 via cooling air outlet 27. Heat exchanger 30 may be disposed within the flow path of the cooling air to facilitate heat transfer between the fluid(s) carrying heat from engine 12 and the cooling air. The cooling air upstream of heat exchanger 30 is identified as F. The cooling air inside of housing 26 and downstream of heat exchanger 30 is identified as F', and the cooling air exiting housing 26 via cooling air outlet 27 is identified as F". Since fan 22 is disposed downstream of heat exchanger 30 in relation to the flow path, fan 22 may drive the cooling air through heat exchanger 30 by suction. As shown in FIG. 1, some of the ambient air received via inlet 24 may be directed to engine 12 to sustain the intermittent or continuous combustion process taking place within engine 12. Some of the ambient air received via inlet 24 may be directed to heat exchanger 30 to facilitate heat rejection from engine 12.

Fan 22 may be driven by propeller drive shaft 14 and may be mounted coaxially with propeller 16 and with propeller drive shaft 14. Fan 22 may be mounted for common rotation with propeller 16. In other words, fan 22 may be mounted to rotate at the same rotational speed and in the same direction as propeller 16. Fan 22 may include a bladed disk where a plurality (e.g., a circular array) of fan blades are assembled with a rotor disk or are integrally formed with the rotor disk so that the fan blades and the rotor disk have a unitary construction.

Figure 2:
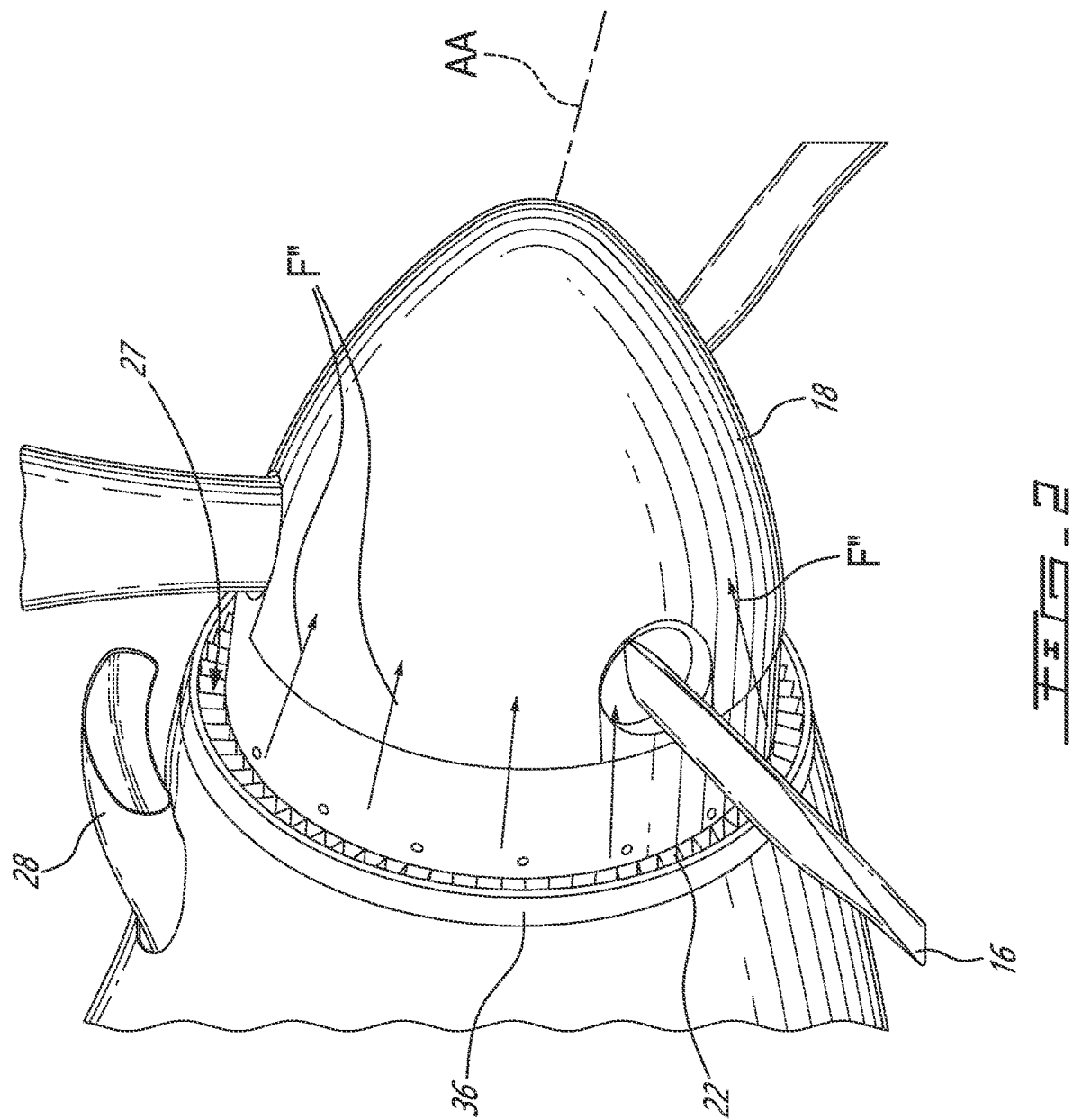
FIG. 2 is a perspective view of an aft portion of the aircraft propulsion system of FIG. 1.

FIG. 2 is a perspective view of an aft portion of system 10 showing cooling air outlet 27 in relation to propeller 16, spinner 18 and exhaust gas outlet 28. In relation to axis AA, cooling air outlet 27 may be disposed radially inwardly of exhaust gas outlet 28.

Figure 3:
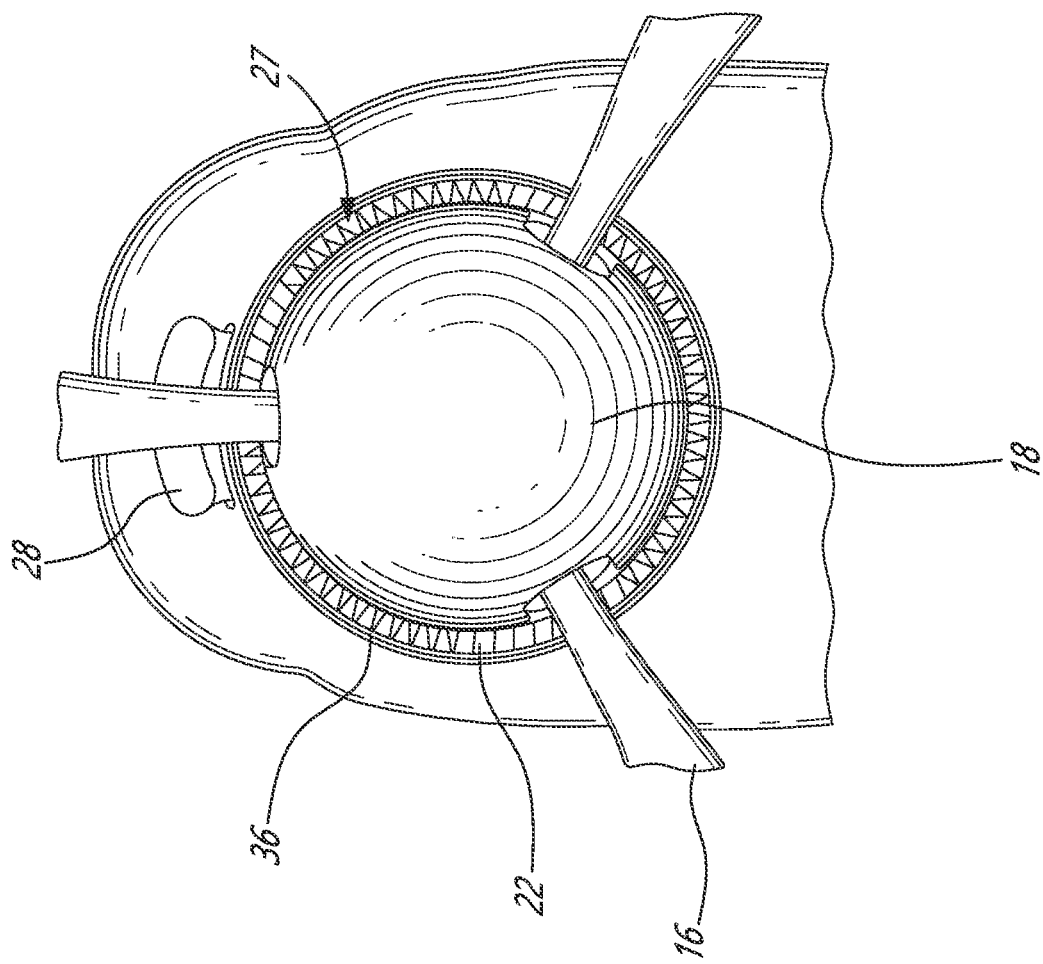
FIG. 3 is a forward-facing elevation view of the aft portion of the aircraft propulsion system of FIG. 1.

FIG. 3 is a forward-facing elevation view of an aft portion of system 10. In reference to FIGS. 2 and 3, cooling air outlet 27 may be substantially annular and coaxial with axis AA and with propeller drive shaft 14. Cooling air outlet 27 may extend substantially completely around propeller drive shaft 14. Fan 22 may be mounted inside of cooling air outlet 27 and also axially spaced apart from the blades of propeller 16. Fan 22 may be disposed forward (i.e., upstream) of the blades of propeller 16. For example, fan 22 may be disposed forward of spinner 18. The blades of propeller 16 may be disposed axially between fan 22 and distal end 20 of spinner 18.

Cooling air outlet 27 may be disposed radially outwardly of spinner 18. For example, annular cooling air outlet 27 may circumscribe spinner 18 so that cooling air exiting cooling air outlet 27 (see F" in FIG. 2) may be discharged generally along a direction that is substantially tangent to an outer surface of spinner 18. In some embodiments, depending on the applicable flow conditions, the cooling air discharged from cooling air outlet 27 may promote beneficial flow conditions around spinner 18 by reenergizing the boundary layer and potentially reducing drag. In some embodiments, fixed or variable orientation guide vanes could be disposed within the flow path of the cooling air (e.g., immediately) upstream of fan 22 to achieve desired flow conditions of the cooling air exiting cooling air outlet 27. Such guide vanes could be mounted to outer shroud 36 and/or to an inner shroud at least partially defining cooling air outlet 27. Fan 22 may be a ducted fan by way of outer shroud 36.

Figure 4:
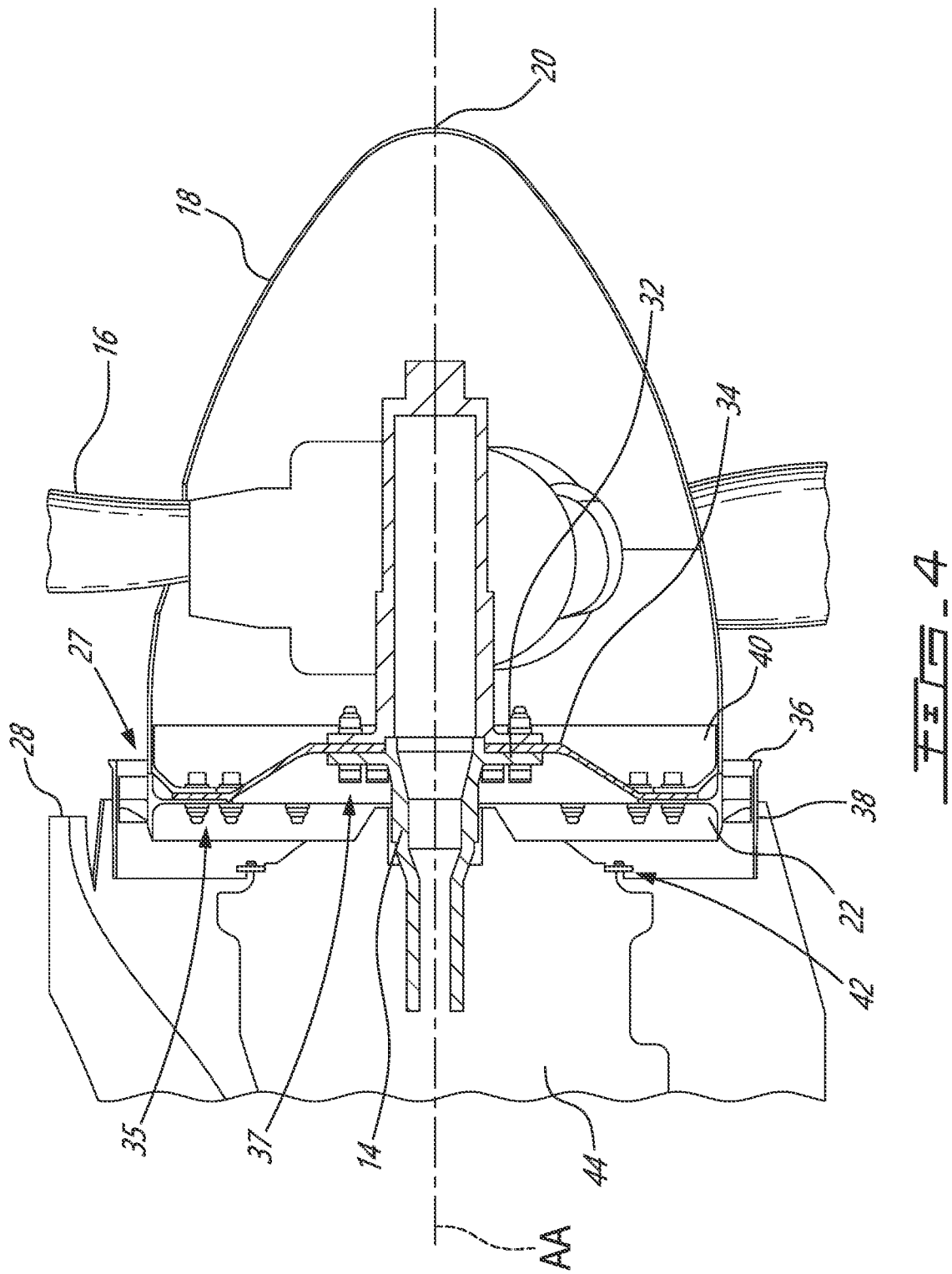
FIG. 4 is an enlarged axial cross-section view of the aft portion of the aircraft propulsion system of FIG. 1.

FIG. 4 is an enlarged axial cross-section view of the aft portion of system 10. Fan 22 may be in driving engagement with propeller drive shaft 14 in any suitable manner. For example, spinner backplate 34 may interconnect spinner 18 and propeller drive shaft 14. For example, spinner backplate 34 may be fastened to spinner 18 and also fastened to flange 32 of propeller drive shaft 14. Fan 22 may be fastened to spinner backplate 34 at fastening location 35. For example, the same bolts may be used to fasten both spinner 18 and fan 22 to spinner backplate 34. Spinner adapter 40 may interconnect spinner 18 with spinner backplate 34. Propeller 16 may also be fastened to flange 32 of propeller drive shaft 14 at fastening location 37. For example, the same bolts may be used to fasten both spinner backplate 34 and propeller 16 to flange 32 of propeller drive shaft 14. In some embodiments, instead of being separate components, fan 22 and backplate 34 may be integrally formed to have a unitary construction. Such unitary construction could optionally also include spinner adaptor 40.

Shroud 36 may be fastened to a housing of gearbox 44 at fastening location 42. However, shroud 36 may instead be mounted to another stationary component of system 10 so that shroud 36 may be stationary relative to rotating fan 22. A (e.g., compressible) seal 38 may be installed between an outer surface of shroud 36 and housing 26. Seal 38 may hinder the leakage of ambient air inside of housing 26 in order to promote the flow of cooling air driven by fan 22 to be drawn into the flow path via inlet 24 and through heat exchanger 30. Seal 38 may extend circumferentially around shroud 36.

Figure 5:
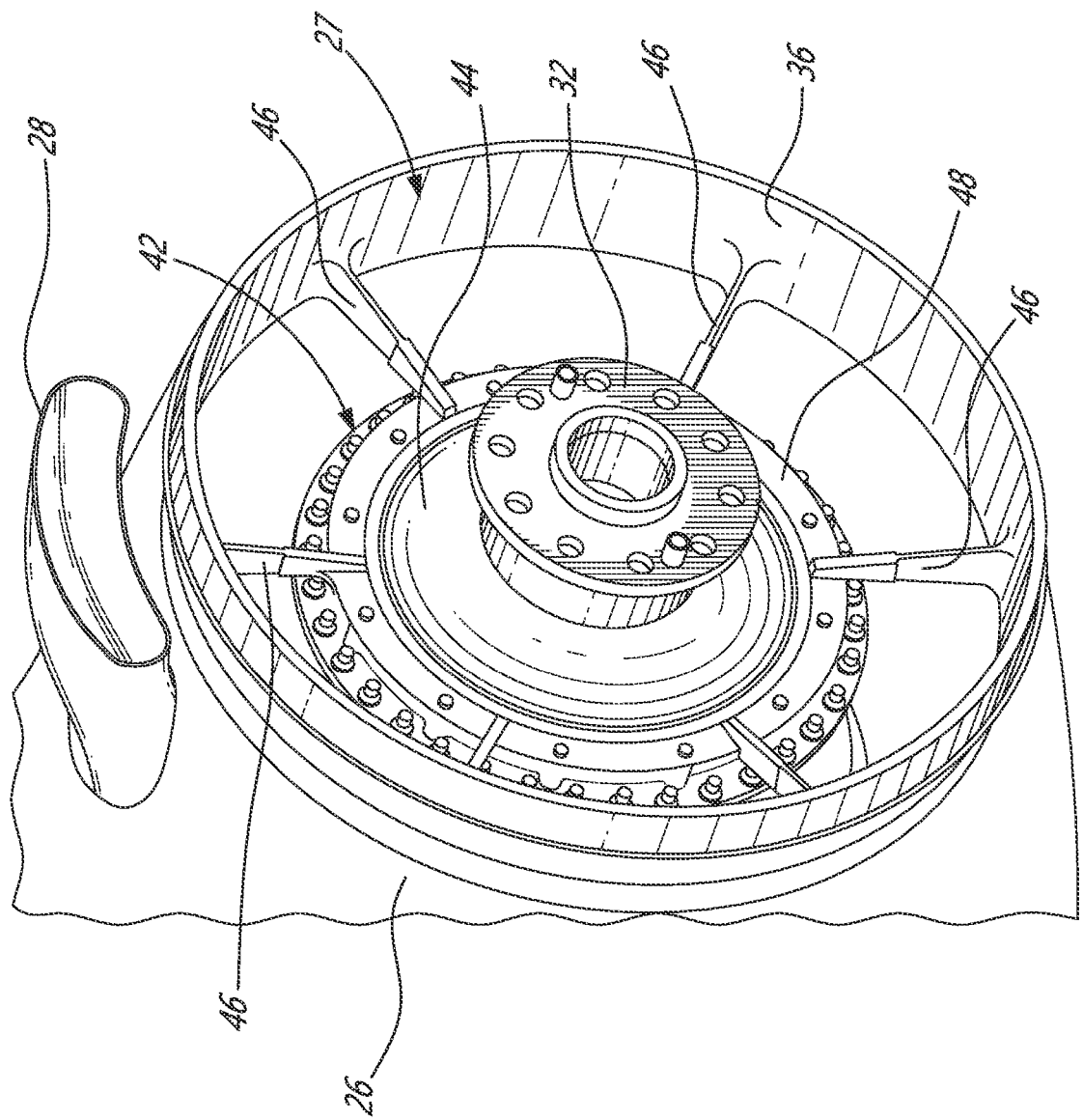
FIG. 5 is a perspective view of the aft portion of the aircraft propulsion system of FIG. 1 with components removed to show a fan shroud.

FIG. 5 is a perspective view of the aft portion of system 10 with components removed to show shroud 36 and the attachment of shroud 36 to gearbox 44 at fastening location 42. Shroud 36 may be connected to inner ring 48 via one or more radial struts 46 serving as spokes and structurally interconnecting shroud 36 with inner ring 48. Inner ring 48 may include fastener holes that are used to secure inner ring 48 to gearbox 44 at fastening location 42. Struts 46 may extend radially across substantially annular cooling air outlet 27.

Figure 6:
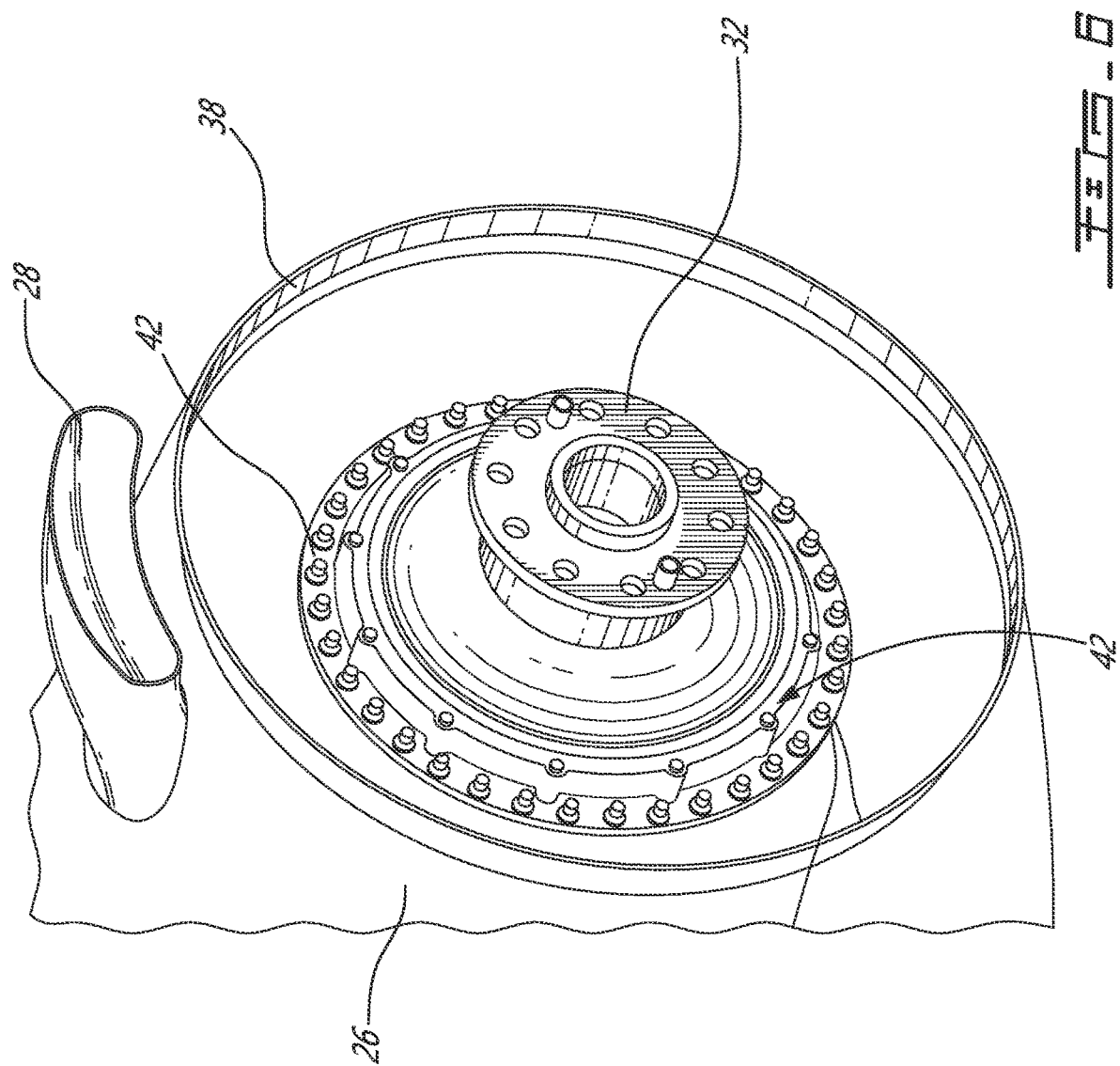
FIG. 6 is a perspective view of the aft portion of the aircraft propulsion system of FIG. 1 with the fan shroud removed.

FIG. 6 is a perspective view of the aft portion of system 10 with fan shroud 36 removed to illustrate fastening location 42 provided on the housing of gearbox 44 for mounting shroud 36 to gearbox 44.

Figure 7:
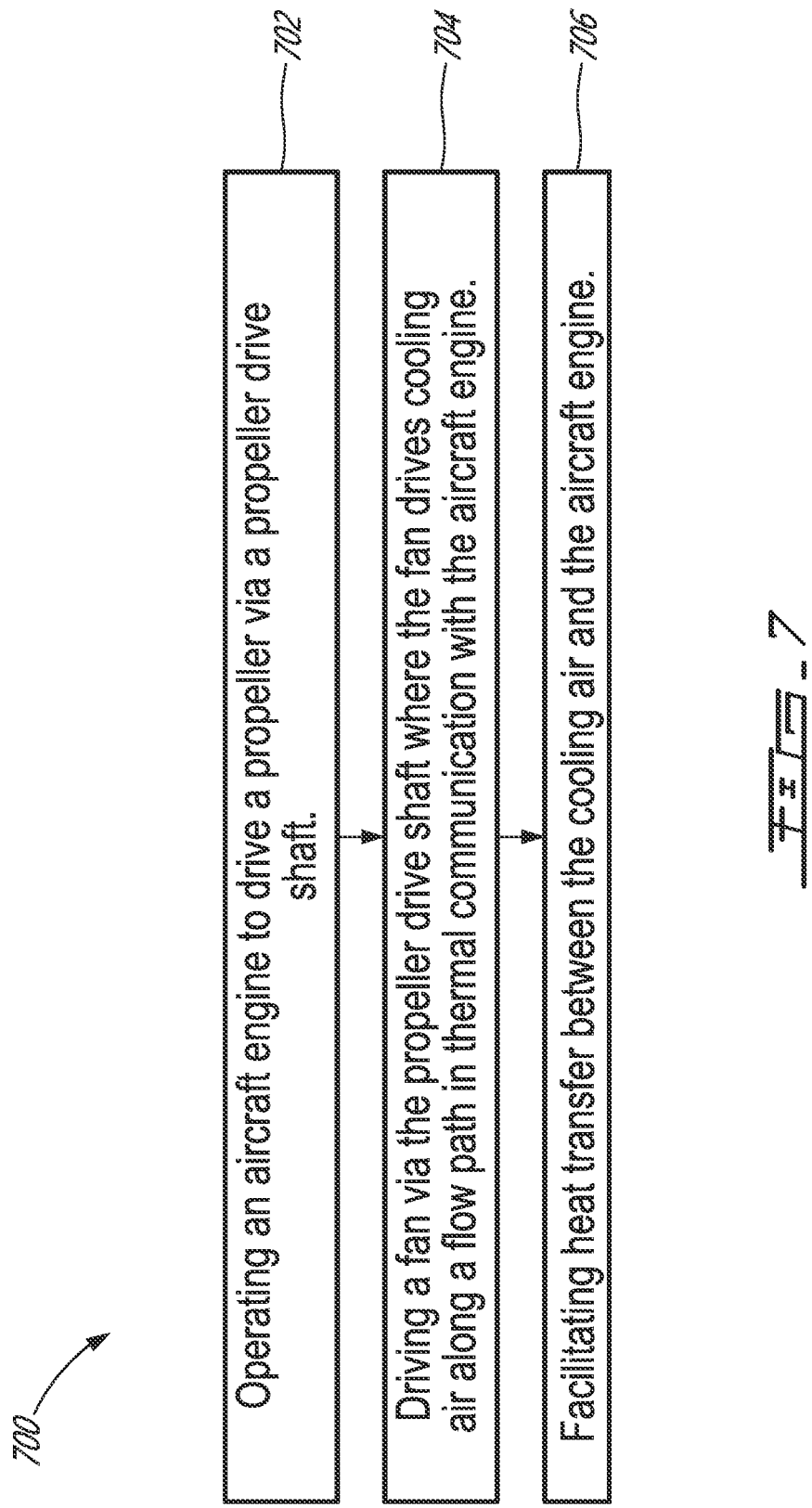
FIG. 7 is a flow chart of an exemplary method of cooling an internal combustion aircraft engine driving a propeller in a pusher configuration.

FIG. 7 is flow chart of an exemplary method 700 of cooling an (e.g., internal combustion) aircraft engine driving a propeller (e.g., in a pusher configuration). Method 700 may be performed using system 10 described herein, or with other aircraft propulsion systems. It is understood that aspects of method 700 may be combined with other aspects or steps described herein.

In reference to FIG. 1, method 700 may include: operating (e.g., internal combustion) engine 12 (e.g., using intermittent combustion) to drive propeller 16 via propeller drive shaft 14 (block 702); driving fan 12 via propeller drive shaft 14 where fan 12 drives cooling air along a flow path in thermal communication with engine 12 (block 704); and facilitating heat transfer between the cooling air and engine 12 (block 706).

In some embodiments of method 700, propeller 16, fan 22 and propeller drive shaft 14 may rotate at a same rotational speed. Facilitating heat transfer between the cooling air and engine 12 may include facilitating heat transfer between the cooling air and another different fluid (e.g., liquid) carrying heat out from engine 12.

Figure 8:
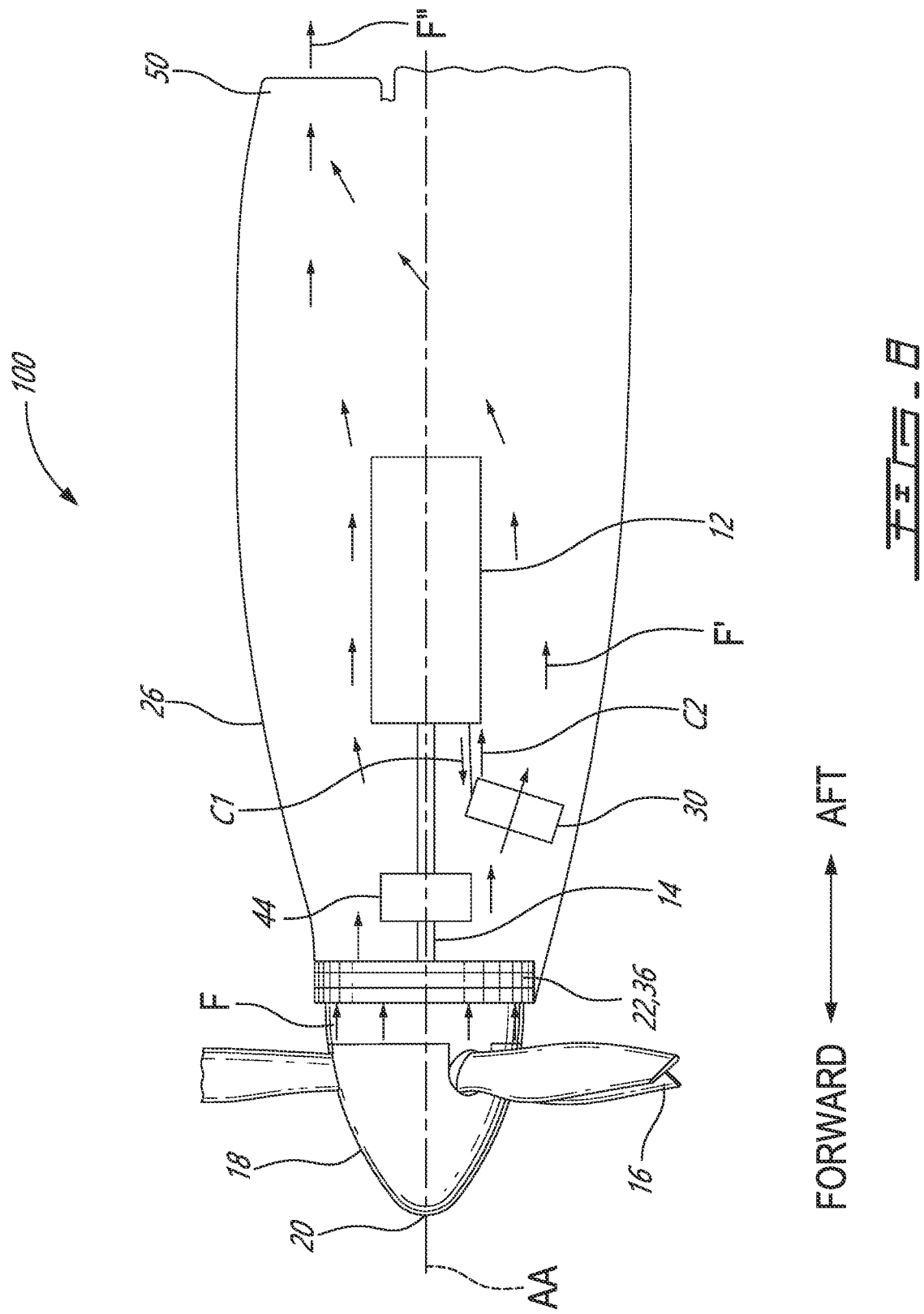
FIG. 8 shows a schematic side elevation view of an aircraft propulsion system having a tractor configuration and a cooling fan as described herein.

FIG. 8 shows a partial schematic side elevation view of aircraft propulsion system 100 having a tractor configuration and fan 22 as described herein. Aspects described above in relation to system 10 may also be applicable to system 100. System 100 may have elements previously described above in relation to system 10. Like elements have been identified using like reference characters. In a tractor configuration, fan 22, propeller 16, and spinner 18 may be disposed forward (i.e., upstream) of engine 12. Also, instead of being disposed within a cooling air outlet, the previously described cooling air outlet 27 may serve as a cooling air inlet and fan 22 may drive the cooling air by pushing the cooling air along the flow path and through heat exchanger 30.

During operation of system 100, fan 22 may draw ambient air F through the cooling air inlet defined by shroud 36 and drive the cooling air along one or more flow paths F' inside of housing 26 and which may include heat exchanger 30. The cooling air may then be discharged out of outlet 50 and/or other outlet(s).

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

What is claimed is:

1. An aircraft propulsion system comprising:
    an internal combustion engine using intermittent combustion during operation;
    a propeller drive shaft drivingly engaged with the internal combustion engine;
    a propeller for propelling an aircraft, the propeller being drivingly engaged with the propeller drive shaft, the propeller being disposed aft of the internal combustion engine to define a pusher configuration of the aircraft propulsion system;
    a ducted fan operatively disposed to drive cooling air along a flow path in thermal communication with the internal combustion engine, the fan being drivingly engaged with the propeller drive shaft and being disposed aft of the internal combustion engine, the fan and the propeller being coaxial;
    an outer shroud at least partially defining an annular cooling air outlet of the flow path, the fan being disposed within the outer shroud; and
    a gearbox operatively disposed between the internal combustion engine and the propeller drive shaft, the outer shroud being fastened to a housing of the gearbox via one or more struts extending radially across cooling air outlet.

2. The aircraft propulsion system of claim 1, comprising a heat exchanger configured to facilitate heat transfer between the cooling air and a fluid carrying heat from the internal combustion engine.

3. The aircraft propulsion system of claim 1, wherein the fan is axially spaced apart from blades of the propeller relative to the propeller drive shaft.

4. The aircraft propulsion system of claim 1, wherein the fan and the propeller are configured for common rotation with the propeller drive shaft.

5. The aircraft propulsion system of claim 1, wherein
the cooling air outlet is separate from an exhaust gas outlet of the internal combustion engine.

6. The aircraft propulsion system of claim 5, wherein the cooling air outlet is disposed radially inwardly of the exhaust gas outlet relative to the propeller drive shaft.

7. The aircraft propulsion system of claim 5, wherein the cooling air outlet is substantially coaxial with the propeller drive shaft.

8. The aircraft propulsion system of claim 1, wherein:
the fan, the propeller drive shaft and the propeller are coaxial;
the fan is disposed forward of blades of the propeller; and
the cooling air outlet is separate from an exhaust gas outlet of the internal combustion engine.

9. The aircraft propulsion system of claim 8, comprising a spinner fitted over a hub of the propeller and a spinner backplate interconnecting the spinner and the propeller drive shaft, the fan being fastened to the spinner backplate.

10. An aircraft propulsion system having a pusher configuration, the aircraft propulsion system comprising:
an engine;
a propeller drive shaft drivingly engaged with the engine;
a propeller for propelling an aircraft, the propeller having propeller blades and being drivingly engaged with the propeller drive shaft and being disposed aft of the engine;
a ducted fan operatively disposed to drive cooling air along a flow path in thermal communication with the engine, the fan having fan blades and being drivingly engaged with the propeller drive shaft, the fan being disposed aft of the engine, the fan and the propeller being coaxial;
a heat exchanger configured to facilitate heat transfer between the cooling air driven by the fan and a fluid carrying heat from the engine;
an outer shroud at least partially defining an annular cooling air outlet of the flow path, the fan being disposed within the outer shroud; and
a gearbox operatively disposed between the engine and the propeller drive shaft, the outer shroud being fastened to a housing of the gearbox via one or more struts extending radially across cooling air outlet.

11. The aircraft propulsion system of claim 10, wherein the fan is axially spaced apart from the propeller blades relative to the propeller drive shaft.

12. The aircraft propulsion system of claim 10, wherein the cooling air outlet is separate from an exhaust gas outlet of the engine.

13. The aircraft propulsion system of claim 10, wherein:
the fan, the propeller drive shaft and the propeller are coaxial; and
the fan is axially spaced apart from the propeller blades relative to the propeller drive shaft.

14. The aircraft propulsion system of claim 10, wherein the engine is an internal combustion engine using intermittent combustion during operation.

* * * * *